(12) United States Patent
Hung (10) Patent No.: US 8,297,560 B2
(45) Date of Patent: Oct. 30, 2012

(54) LINE-MANAGEMENT ASSEMBLY

(75) Inventor: Chin-Jui Hung, Wu-Chi Chen (TW)

(73) Assignee: Modernsolid Industrial Co., Ltd., Taichung Hsien (TW)

( * ) Notice: Subject to any disclaimer, the term of this patent is extended or adjusted under 35 U.S.C. 154(b) by 275 days.

(21) Appl. No.: 12/853,374

(22) Filed: Aug. 10, 2010

(65) Prior Publication Data

US 2012/0037255 A1   Feb. 16, 2012

(51) Int. Cl.
*F16L 3/00* (2006.01)
(52) U.S. Cl. ............... 248/49; 248/58; 59/78.1; 174/95
(58) Field of Classification Search ............. 248/49, 248/51, 58, 60, 324; 59/78.1; 174/75 R, 174/84 R, 95
See application file for complete search history.

(56) References Cited

U.S. PATENT DOCUMENTS

| | | | |
|---|---|---|---|
| 4,392,344 A * | 7/1983 | Gordon et al. | 59/78.1 |
| 4,625,936 A * | 12/1986 | Hadden, Sr. | 248/544 |
| 4,840,023 A * | 6/1989 | Borsani | 59/78.1 |
| 5,900,586 A * | 5/1999 | Carr | 174/95 |
| 6,321,524 B1 * | 11/2001 | Bro | 59/78.1 |
| 6,433,282 B1 * | 8/2002 | Traversa | 174/95 |
| 7,278,253 B2 * | 10/2007 | Wehler et al. | 59/78.1 |
| 7,385,136 B2 * | 6/2008 | Ogawa et al. | 174/19 |
| 7,439,446 B2 * | 10/2008 | Blase et al. | 174/95 |
| 7,484,351 B2 * | 2/2009 | Harada et al. | 59/78.1 |
| 7,515,806 B2 * | 4/2009 | Zellak et al. | 385/137 |
| 7,584,597 B2 * | 9/2009 | Blase et al. | 59/78.1 |

FOREIGN PATENT DOCUMENTS

| | | |
|---|---|---|
| DE | 19716695 C1 | 12/1998 |
| DE | 20300290 U1 | 4/2003 |

OTHER PUBLICATIONS

English Language Abstract of EP 0875695 A1 which is a corresponding document of DE 19716695 C1.
English Language Abstract of EP 1394915 A1 which is a corresponding document of DE 20300290 U1.

* cited by examiner

*Primary Examiner* — Bradley Duckworth
(74) *Attorney, Agent, or Firm* — Hershkovitz & Associates, LLC; Abraham Hershkovitz (57) ABSTRACT

A line-management assembly has a base, a collating device and a connecting device. The base has a bottom board, a linking panel and a linking frame. The linking frame is rotatably connected to the linking panel and has a mounting tube, an outer casing, multiple storing spaces and two linking arms. The collating device is pivotally connected to the base and has multiple extending frames. The extending frames are detachably connected each other, the lowest one of the extending frames is detachably attached to the linking frame of the base and each extending frame has a central tube, an outer cover, multiple collating spaces and two extending arms. The connecting device is detachably connected to the collating device and has a connecting frame. The connecting frame is detachably connected to the uppermost extending frame of the collating device.

10 Claims, 14 Drawing Sheets

LINE-MANAGEMENT ASSEMBLY

BACKGROUND OF THE INVENTION

1. Field of the Invention

The present invention relates to a line-management assembly, and more particularly relates to a line-management assembly that is adjustable in length based on user's needs and can be assembled and used conveniently.

2. Description of Related Art

When using the electric or 3C products, a conventional line-management assembly is always used to collate and store power cords or lines of the electric or 3C products to prevent the power cords or lines from winding with each other or tripping someone. The conventional line-management assembly substantially has a pipe or a casing to store the power cords or lines.

However, the pipe or casing of the conventional line-management assembly has a specified length and size. If the length and the size of the power cord or line are longer and larger than that of the pipe or casing of the conventional line-management assembly, to buy another longer conventional line-management assembly is necessary. Furthermore, if the length of the power cord or line is shorter than that of the pipe or casing of the conventional line-management assembly, the power cord or line cannot extend throughout of the conventional line-management assembly to connect with an outlet.

Therefore, the length of the pipe or casing of the conventional line-management assembly cannot be changed or adjusted according to the user's need and this is inconvenient in use. Additionally, the conventional line-management assembly is usually placed on a table or the ground in use but cannot be held in position to cause the slide of the conventional line-management assembly.

Therefore, the present invention provides a line-management assembly to mitigate or obviate the aforementioned problems.

SUMMARY OF THE INVENTION

The main objective of the present invention is to provide a line-management assembly that can be operated conveniently and the length of the line-management assembly can be adjusted according to the user's need.

The line-management assembly in accordance with the present invention has a base, a collating device and a connecting device. The base has a bottom board, a linking panel and a linking frame. The linking frame is rotatably connected to the linking panel and has a mounting tube, an outer casing, multiple storing spaces and two linking arms. The collating device is pivotally connected to the base and has multiple extending frames. The extending frames are detachably connected each other, the lowest one of the extending frames is detachably attached to the linking frame of the base and each extending frame has a central tube, an outer cover, multiple collating spaces and two extending arms. The connecting device is detachably connected to the collating device and has a connecting frame. The connecting frame is detachably connected to the uppermost extending frame of the collating device.

DETAILED DESCRIPTION OF THE PREFERRED EMBODIMENT

With reference to FIGS. 1 to 4, 5, 8 and 11, a line-management assembly in accordance with the present invention comprises a base 10, a collating device 20 and a connecting device 30, 30A, 30B, 30C.

Figure 1:
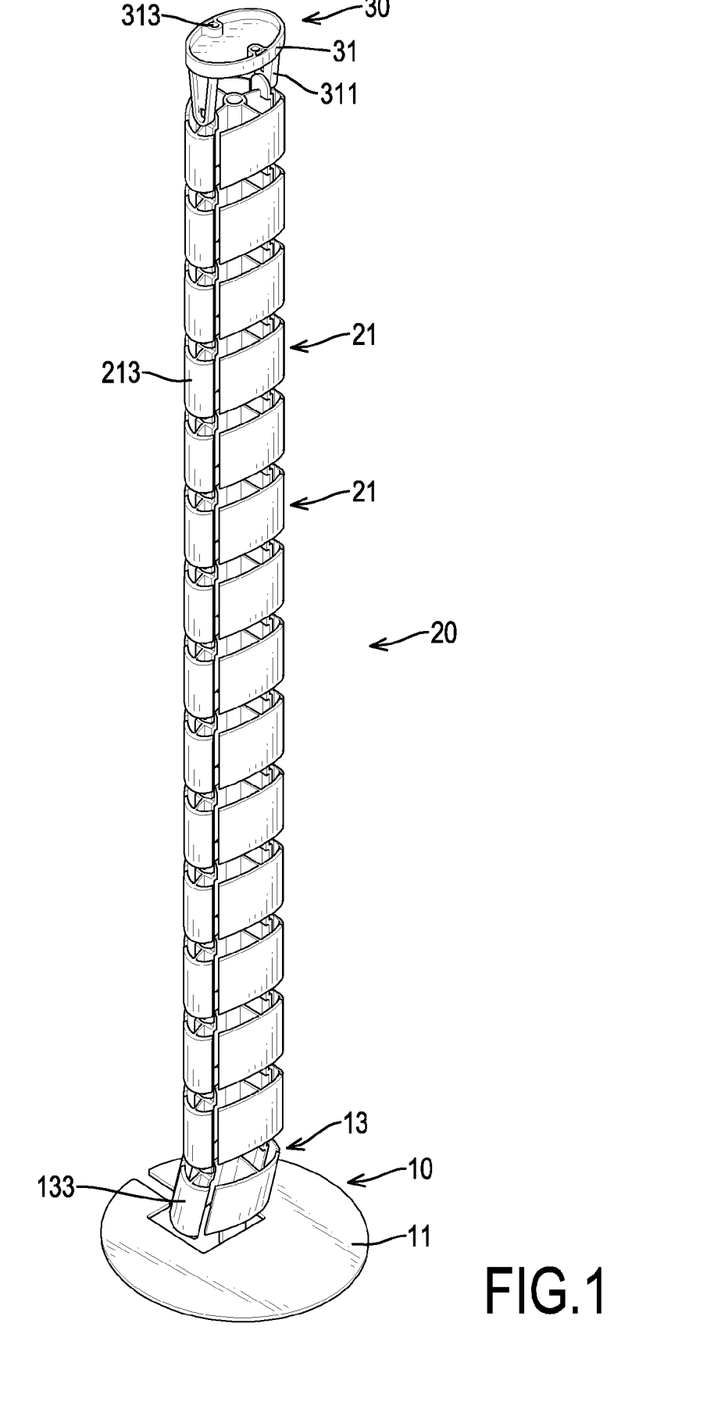
FIG. 1 is a perspective view of a first embodiment of a line-management assembly in accordance with the present invention.
Figure 2:
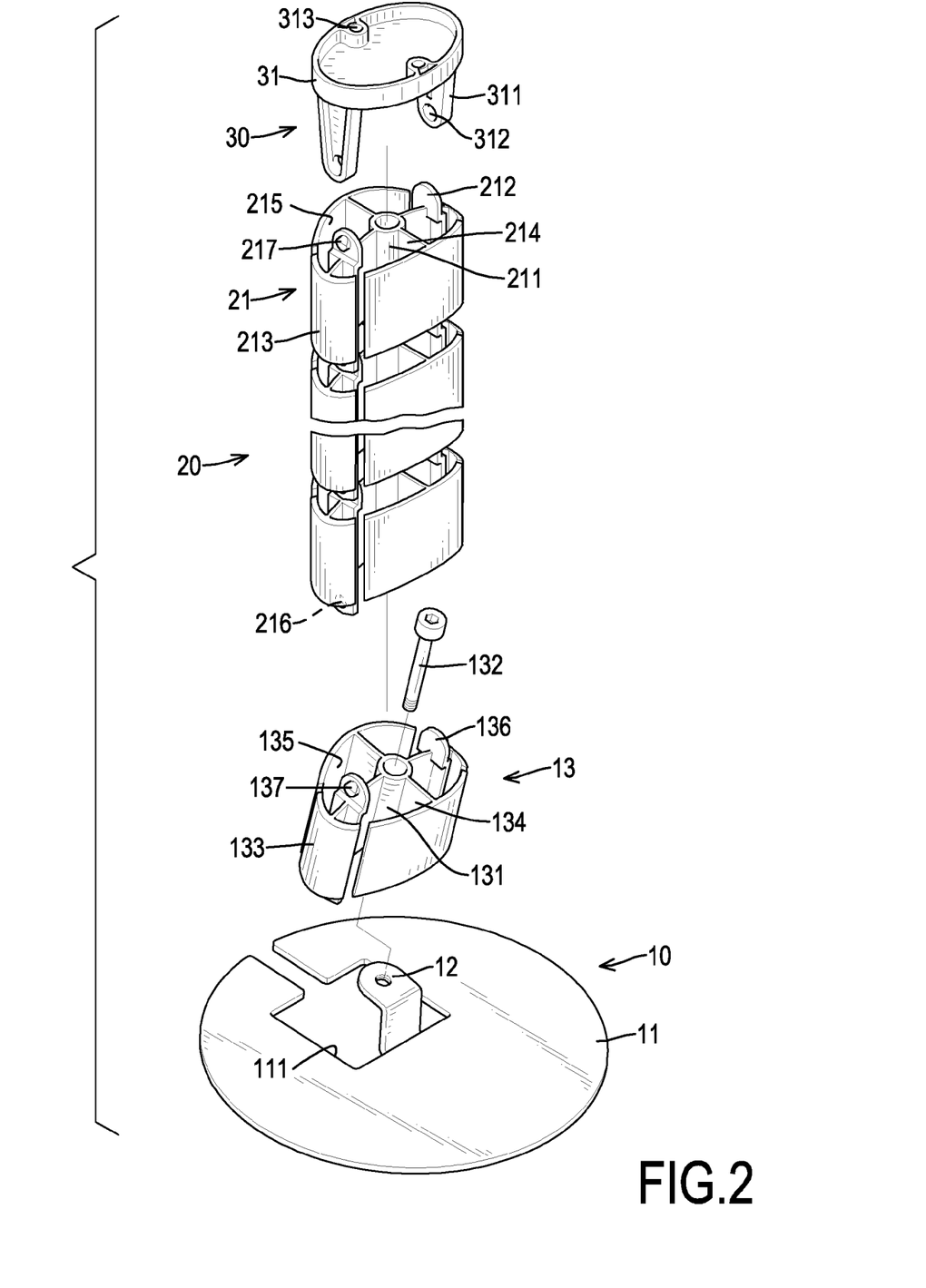
FIG. 2 is an enlarged exploded perspective view of the line-management assembly in FIG. 1.

The base 10 has a bottom board 11, a linking panel 12 and a linking frame 13. The bottom board 11 has a periphery, a center and an opening 111. The opening 111 is formed through the bottom board 11 from the periphery to the center of the bottom board 11.

The linking panel 12 may be L-shaped and is formed on and protrudes from the center of the bottom board 11 and has a top.

The linking frame 13 is rotatably connected to the linking panel 12 and has a mounting tube 131, an outer casing, multiple storing spaces 135 and two linking arms 136. The mounting tube 131 is hollow, is rotatably connected to the top of the linking panel 12 and has an external surface and a fastener 132. The fastener 132 is mounted through the mounting tube 131 and is screwed with the top of the linking panel 12 to hold the mounting tube 131 rotatably with the linking panel 12.

The outer casing is formed around the external surface of the mounting tube 131 and has multiple limiting panels 133. The limiting panels 133 are arranged as an annular shape around the mounting tube 131 at intervals and each limiting panel 133 has an inner surface, a middle and a linking board 134. The linking board 134 is formed on and protrudes from the inner surface of the limiting panel 133 at the middle and is connected to the external surface of the mounting tube 131.

The storing spaces 135 are defined between the mounting tube 131, the linking boards 134 and the limiting panels 133 to store power cords or lines. Preferably, the outer casing has four limiting panels 133 and the linking boards 134 of the limiting panels 133 are arranged as a crisscross shape to form four storing spaces 135.

The linking arms 136 are respectively formed on and protrude from two of the linking boards 134 of the limiting panels 133, and each linking arm 136 has a top end, an outer side and a linking protrusion 137. The top ends of the linking arms 136 extend respectively out of the corresponding linking boards 134 and face each other. The linking protrusions 137 are respectively formed on and protrude from the outer sides of the linking arms 136 at the top ends.

The collating device 20 is pivotally connected to the base 10 and has multiple extending frames 21. The extending frames 21 are detachably connected each other, the lowest one of the extending frames 21 is detachably attached to the linking frame 13 of the base 10 and each extending frame 21 has a central tube 211, an outer cover, multiple collating spaces 215 and two extending arms 212. The central tube 211 is hollow and has an external surface. The outer cover is formed around the external surface of the central tube 211 and has multiple collating panels 213. The collating panels 213 are arranged as an annular shape around the central tube 211 at intervals and each collating panel 213 has an inner surface, a middle and an extending board 214. The extending board 214 is formed on and protrudes from the inner surface of the collating panel 213 at the middle and is connected to the external surface of the central tube 211.

The collating spaces 215 are defined between the central tube 211, the extending boards 214 and the collating panels 213 to collate power cords or lines. Preferably, the outer cover has four collating panels 213 and the extending boards 214 of the collating panels 213 are arranged as a crisscross shape to form four collating spaces 215.

The extending arms 212 are respectively formed on and protrude from two of the extending boards 214 of the collating panels 213, and each extending arm 212 has a top end, a bottom end, an outer side, a locking hole 216 and a locking protrusion 217. The top ends and the bottom ends of the extending arms 216 extend respectively out of the corresponding extending boards 214 and face each other. The locking hole 216 is formed through the bottom end of the extending arm 212. The locking holes 216 in the lowest extending frame 21 engage the linking protrusions 137 on the linking frame 13. The locking protrusions 217 are respectively formed on and protrude from the outer sides of the extending arms 212 at the top ends. The locking protrusions 217 of the extending frame 21 respectively engage the locking holes 216 of the adjacent extending frame 21.

The connecting device 30, 30A, 30B, 30C is detachably connected to the collating device 20 and has a connecting frame 31, 31A, 31B, 31C. The connecting frame 31, 31A, 31B, 31C is detachably connected to the uppermost extending frame 21 of the collating device 20 and has a bottom, a top and two connecting arms 311, 311A, 311B, 311C. The connecting arms 311, 311A, 311B, 311C are formed on and protrude from the bottom of the connecting frame 31, 31A, 31B, 31C and each connecting arm 311, 311A, 311B, 311C has a lower end and a connecting hole 312, 312A, 312B, 312C. The connecting hole 312, 312A, 312B, 312C is formed through the lower end of the connecting arm 311, 311A, 311B, 311C and engages the locking protrusion 217 of one of the extending arms 212 of the corresponding extending frame 21 to connect the connecting device 30, 30A, 30B, 30C with the collating device 20. Preferably, with further reference to FIGS. 2 and 4, the connecting frame 31 further has two holding holes 313 formed through the top of the connecting frame 31 to allow bolts mounting through the holding holes 313 to connect the connecting device 30 onto a bottom of a table 50.

Figure 5:
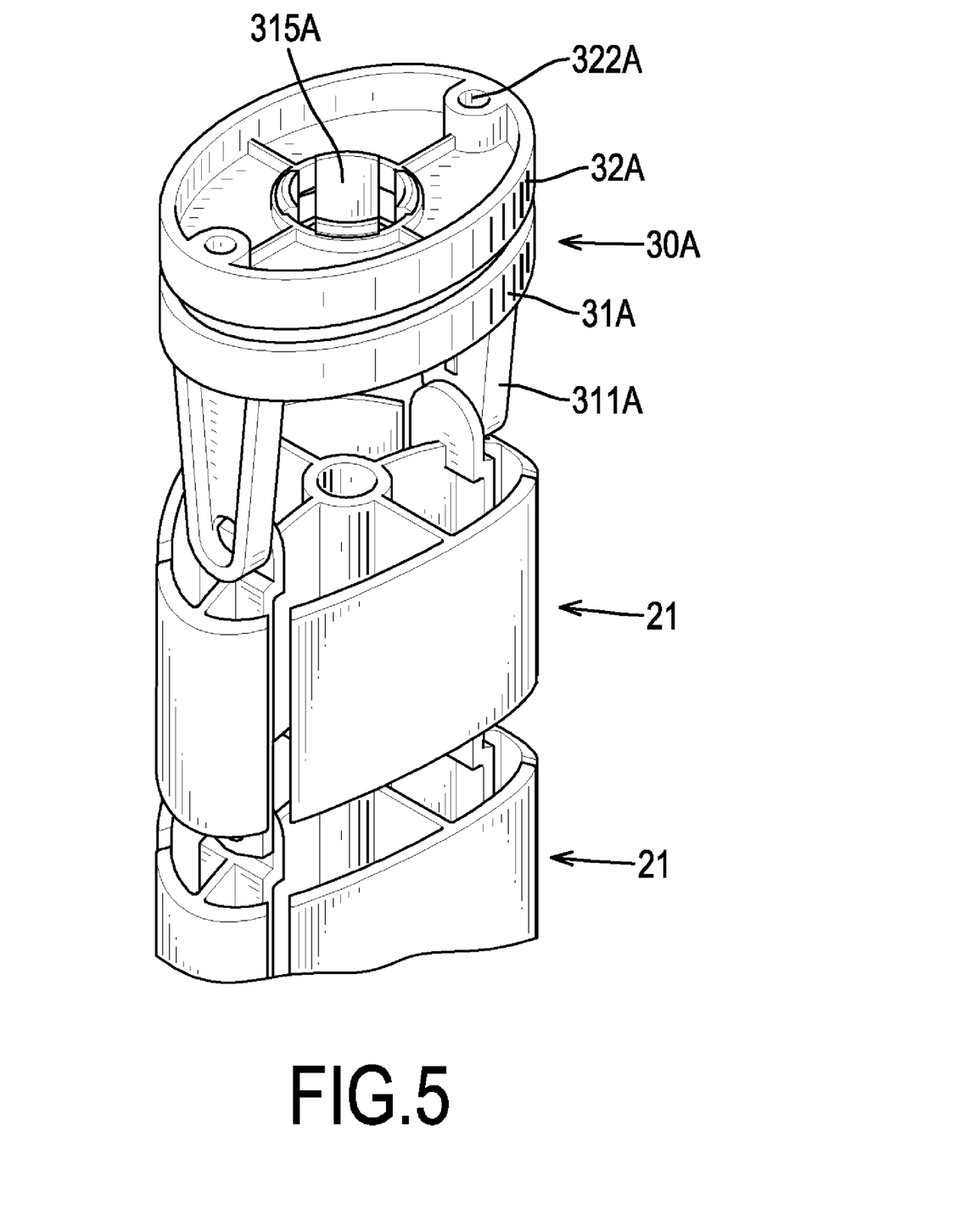
FIG. 5 is an enlarged perspective view of a second embodiment of a line-management assembly in accordance with the present invention.
Figure 6:
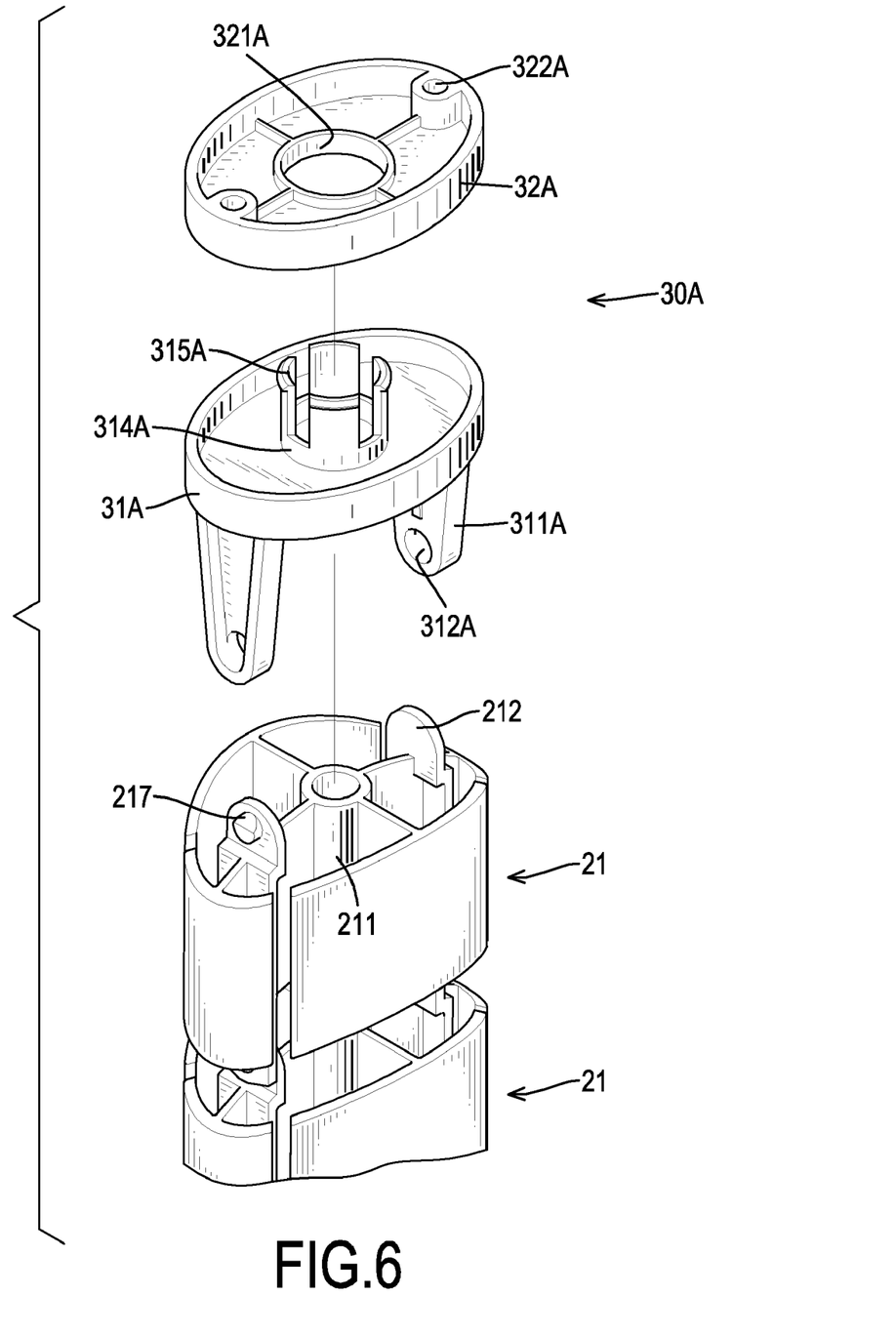
FIG. 6 is an exploded perspective view of the line-management assembly in FIG. 5.
Figure 7:
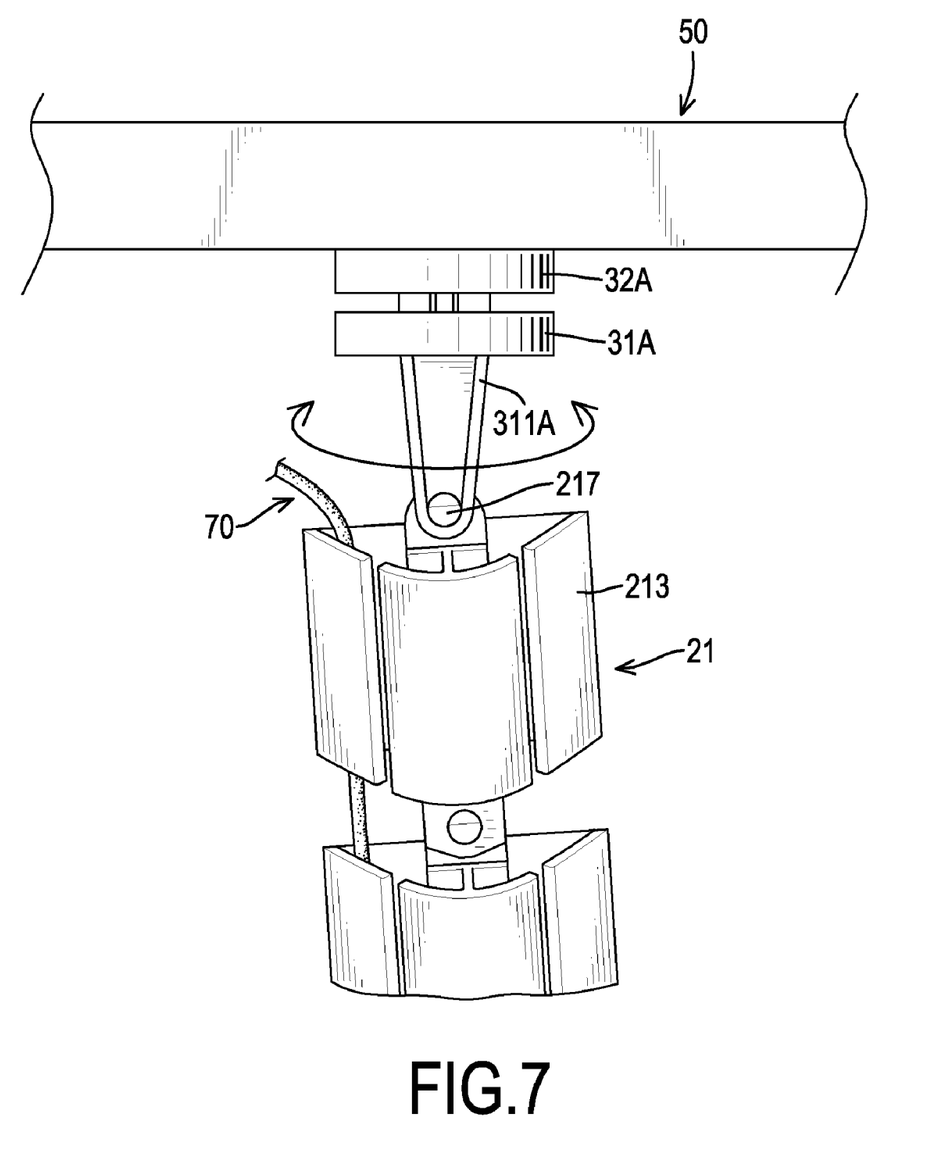
FIG. 7 is an operational side view of the line-management assembly in FIG. 5 connected to a table.

With reference to FIGS. 5 and 6, the connecting frame 31A of the second embodiment of the present invention further has a center and a connecting sleeve 314A. The connecting sleeve 314A is formed on and protrudes from the top of the connecting frame 31A at the center and has a top end and multiple claws 315A. The claws 315A are formed on the top end of the connecting sleeve 314A at intervals. The connecting device 30A of the second embodiment of the present invention further has a holding board 32A. The holding board 32A is detachably connected to the connecting frame 31A and has a center, a top, a clawing hole 321A and two holding holes 322A. The clawing hole 321A is formed through the center of the holding board 32A and engages the claws 315A of the connecting sleeve 314A to hold the connecting frame 31A with the holding board 32A. The holding holes 322A are formed through the top of the holding board 32A to allow bolts mounting through the holding holes 322A to connect the holding board 32A onto a bottom of a table 50 as shown in FIG. 7.

Figure 8:
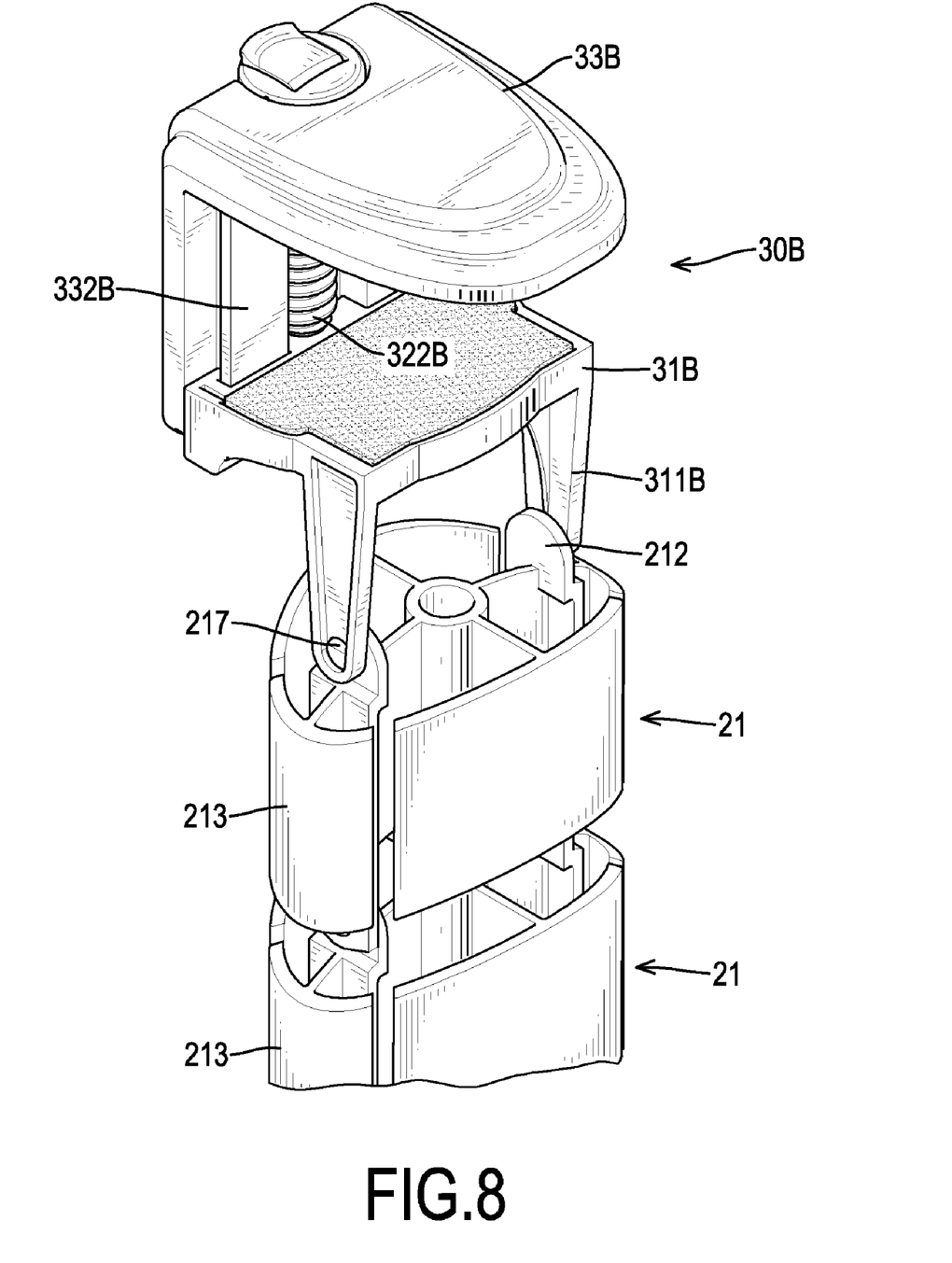
FIG. 8 is an enlarged perspective view of a third embodiment of a line-management assembly in accordance with the present invention.
Figure 9:
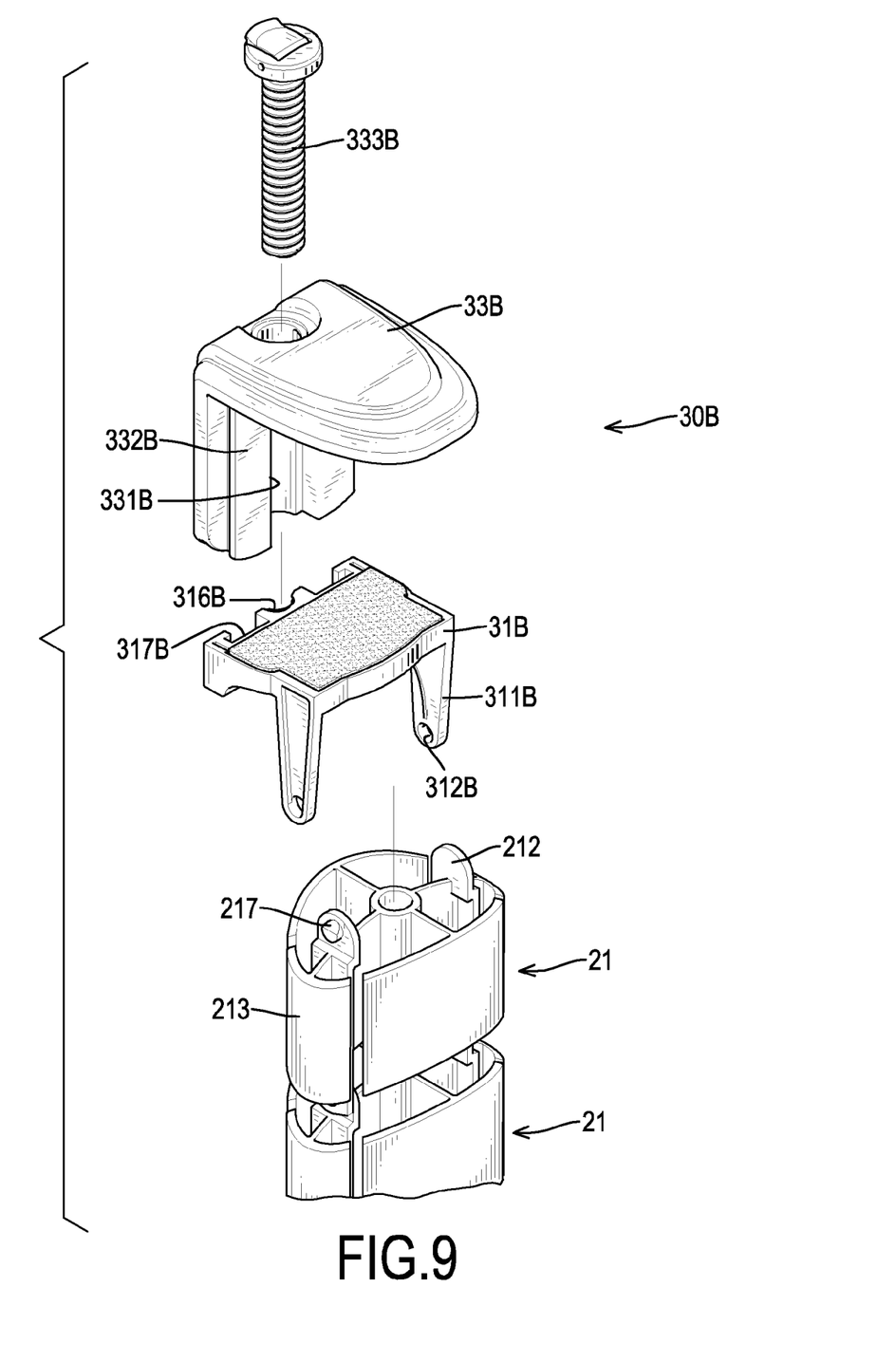
FIG. 9 is an exploded perspective view of the line-management assembly in FIG. 8.

With reference to FIGS. 8 and 9, the connecting frame 31B of the third embodiment of the present invention further has a sidewall, a threaded hole 316B and two guiding grooves 317B. The threaded hole 316B is semicircular and is formed through the sidewall of the connecting frame 31B. The guiding grooves 317B are formed through the sidewall of the connecting frame 31B beside the threaded hole 316B. The connecting device 30B of the third embodiment of the present invention further has a clamping frame 33B. The clamping frame 33B may be L-shaped, is adjustably connected to the connecting frame 31B and has a sidewall, a top, a mounting recess 331B, two guiding rails 332B and a leading screw 333B. The sidewall of the clamping frame 33B faces the sidewall of the connecting frame 31B and has an inner surface.

Figure 10:
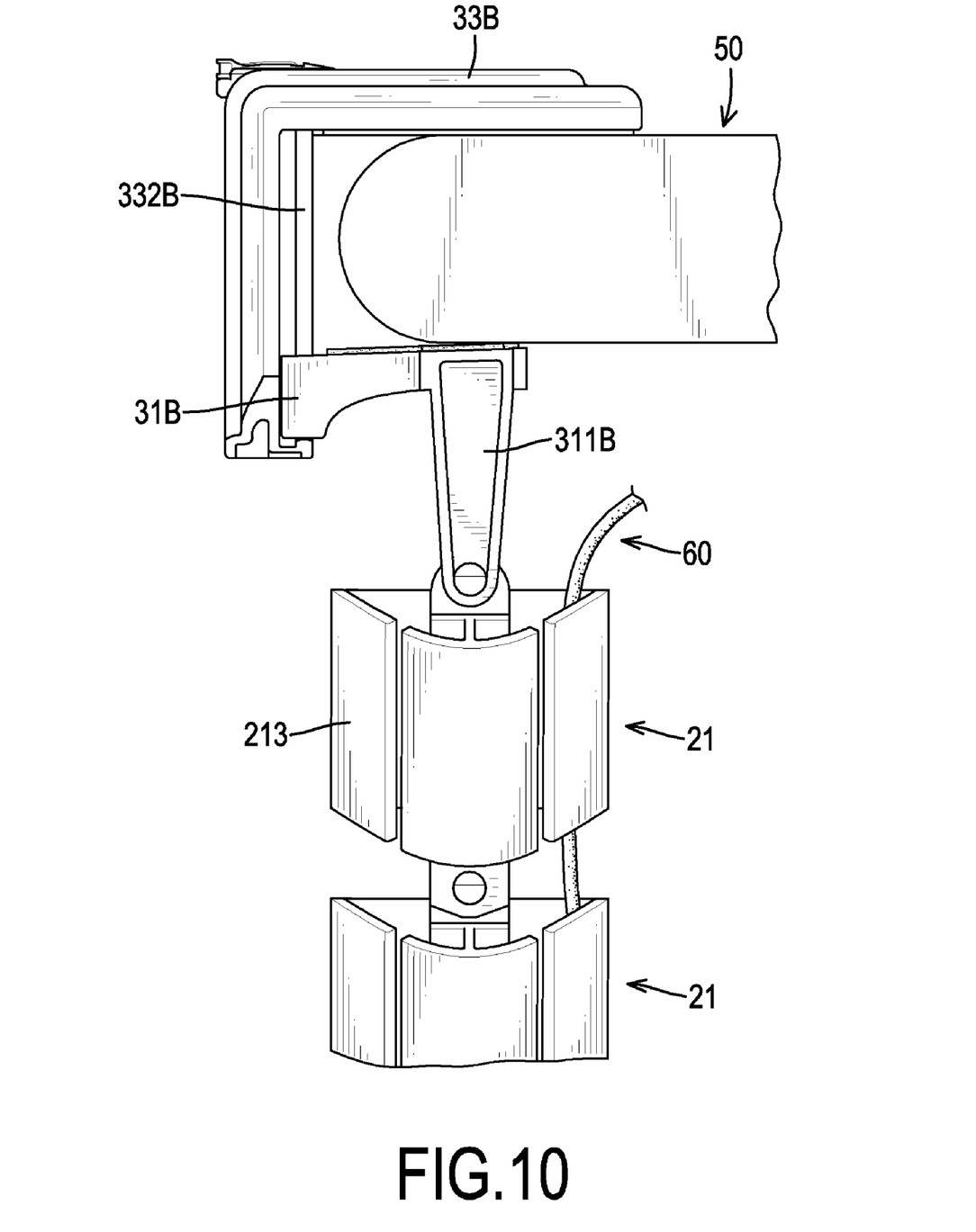
FIG. 10 is an operational side view of the line-management assembly in FIG. 8 mounted on a table.

The mounting recess 331B is formed in the inner surface of the sidewall of the clamping frame 33B, is formed through the top of the clamping frame 33B and aligns with the threaded hole 316B of the connecting frame 31B. The guiding rails 332B are formed on and protrude from the inner surface of the sidewall of the clamping frame 33B and are respectively and movably mounted in the guiding grooves 317B of the connecting frame 31B. The leading screw 333B is rotatably mounted in the mounting recess 331B of the clamping frame 33B and engages the threaded hole 316B of the connecting frame 31B, such that the distance between the tops of the connecting frame 31B and the clamping frame 33B can be changed by rotating the leading screw 333B. By rotating the leading screw 333B, the clamping frame 33B and the connecting frame 31B can respectively clamp on a top and a bottom of a table 50 to hold the connecting device 30B securely on the table 50 as shown in FIG. 10.

Figure 11:
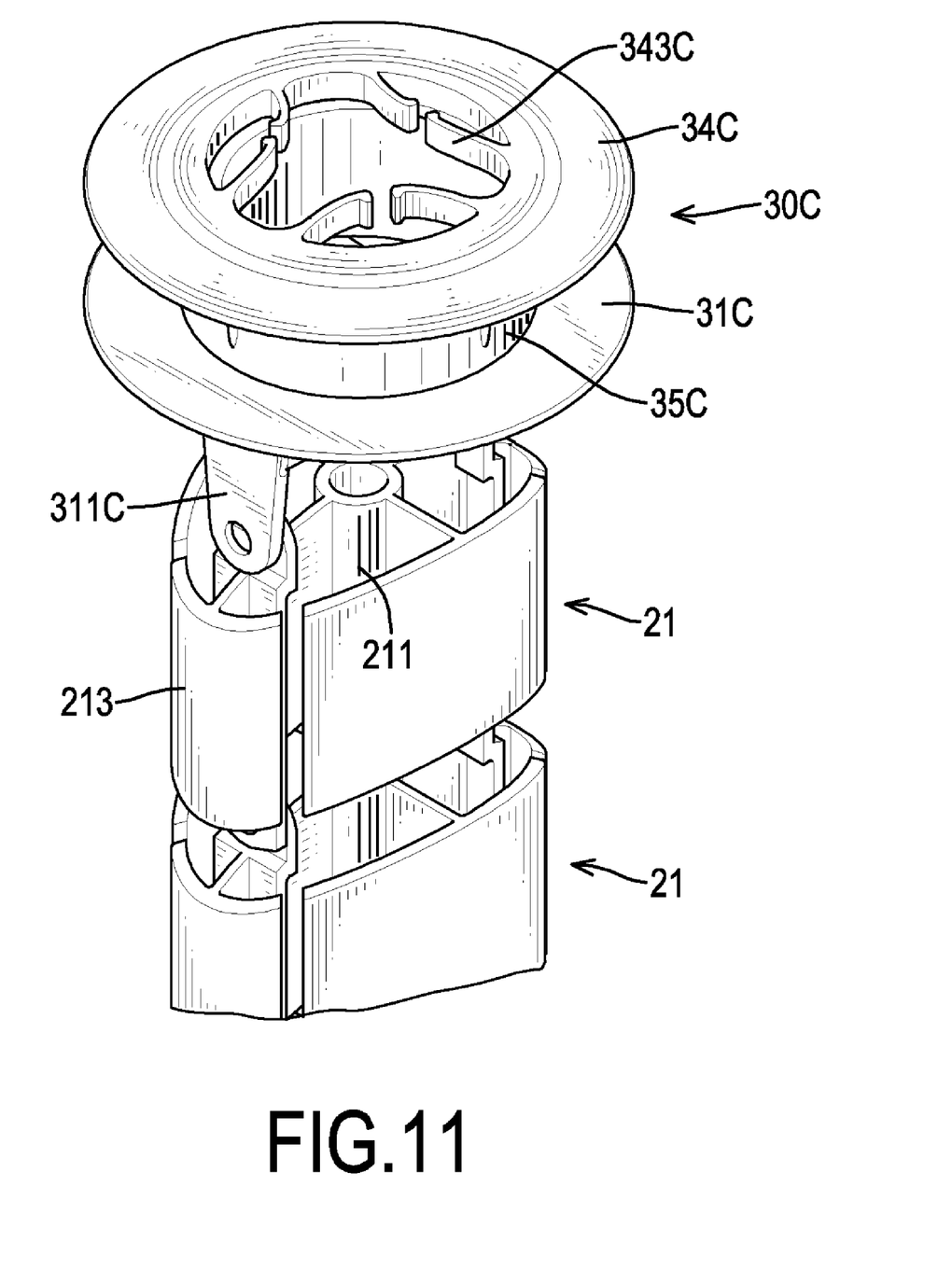
FIG. 11 is an enlarged perspective view of a fourth embodiment of a line-management assembly in accordance with the present invention.
Figure 12:
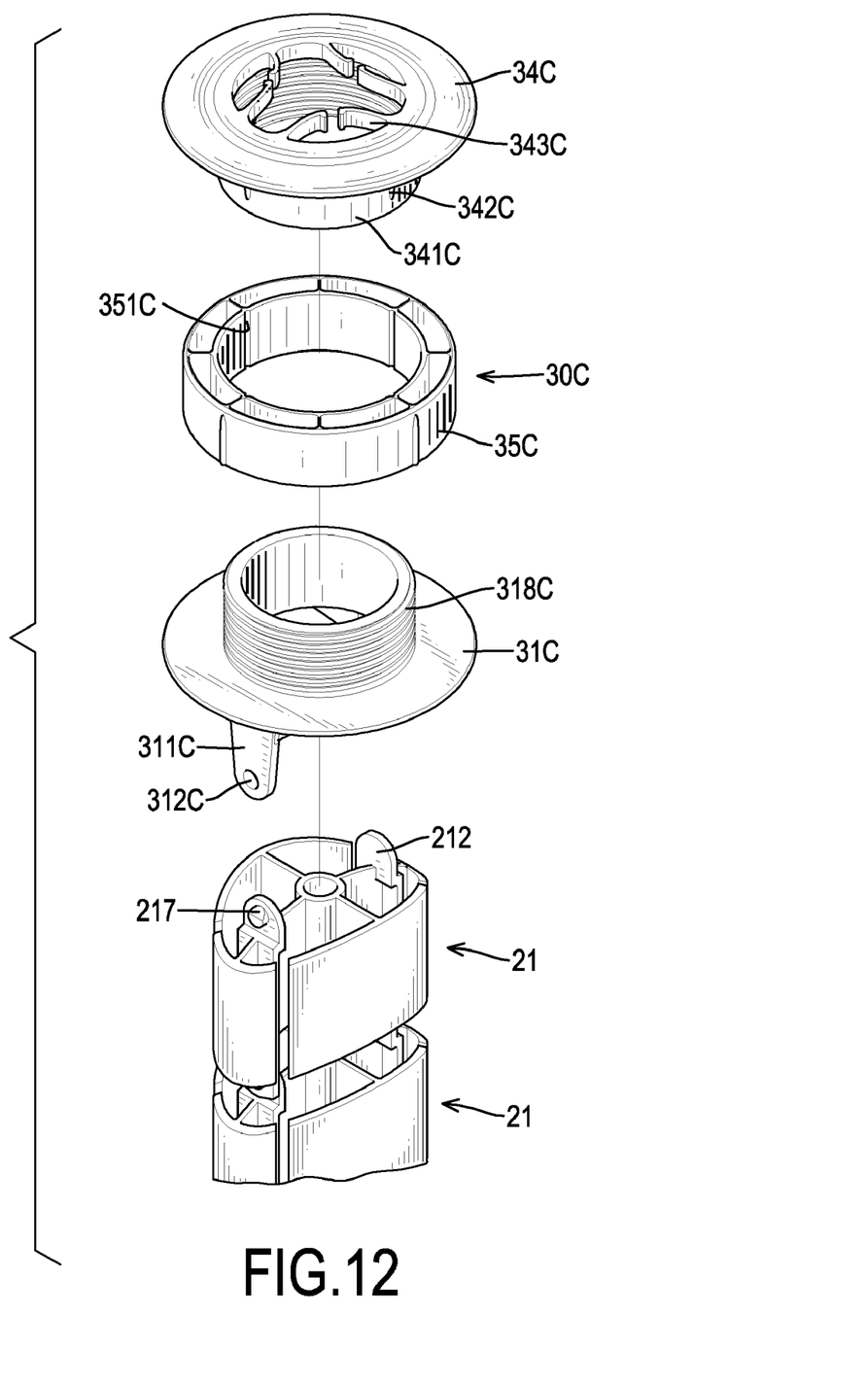
FIG. 12 is an exploded perspective view of the line-management assembly in FIG. 11.

With reference to FIGS. 11 and 12, the connecting frame 31C of the fourth embodiment of the present invention further has a center and a threaded tube 318C. The threaded tube 318C is formed on and protrudes from the top of the connecting frame 31C at the center and communicates with the collating device 20. The connecting device 30C of the fourth embodiment of the present invention further has a decorative cap 34C and an adjusting ring 35C. The decorative cap 34C is screwed with the connecting frame 31C and has a bottom, a top, a mounting jacket 341C, multiple guiding bars 342C and multiple clamping arms 343C. The mounting jacket 341C is formed on and protrudes from the bottom of the decorative cap 34C, is detachably connected to the threaded tube 318C of the connecting frame 31C, communicates with the threaded tube 318C and has a center and an external surface. The guiding bars 342C are formed on and protrudes from the external surface of the mounting jacket 341C at intervals. The clamping arms 343C are formed on the top of the decorative cap 34C at intervals and protrude inward from the mounting jacket 341C.

The adjusting ring 35C is mounted around the mounting jacket 341C between the connecting frame 31C and the decorative cap 34C and has an internal surface and multiple guiding recesses 351C. The guiding recesses 351C are formed in the internal surface of the adjusting ring 35C and are respectively mounted around the guiding bars 342C when the adjusting ring 35C is mounted around the mounting jacket 341C.

Figure 3:
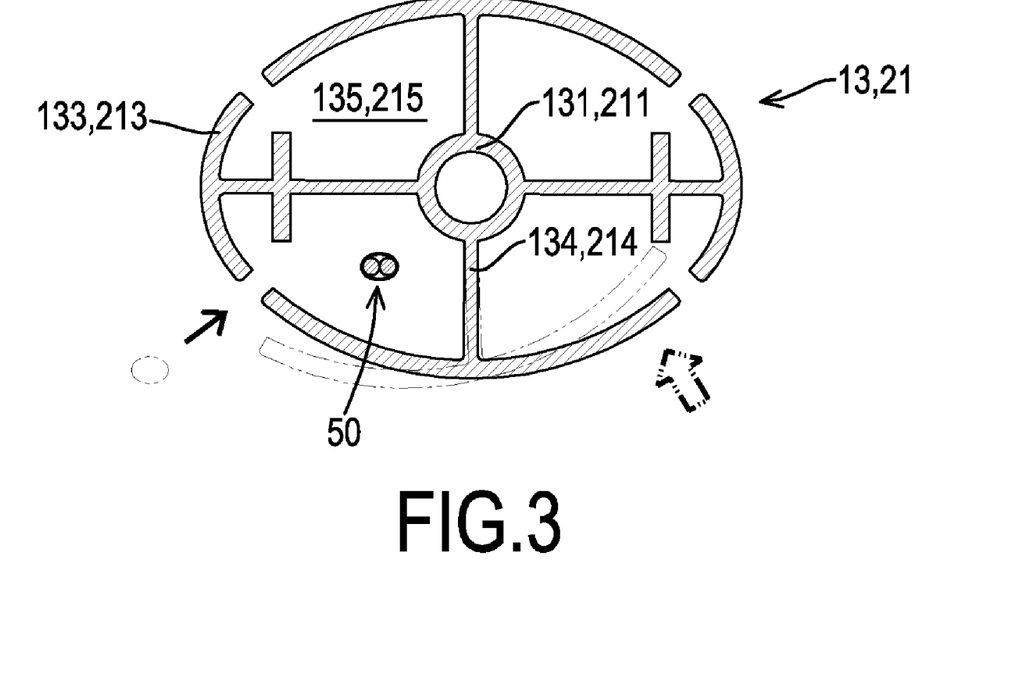
FIG. 3 is an operational cross sectional top view of a linking frame of the line-management assembly in FIG. 1.

When the line-management assembly in accordance with the present invention is used to collate and store the power cords 60 or lines and is connected to a table 50, with reference to FIGS. 2 and 3, one end of the power cord 60 or line is inserted into the linking frame 13 via the opening 111 of the bottom board 11. Then, one of the limiting panels 133 is pressed to widen the interval between the adjacent limiting panels 133 and the power cord 60 or line can be inserted into the storing space 135 between the adjacent limiting panels 133 conveniently and easily as shown in FIG. 3. Furthermore, the length of the collating device 20 can be adjusted according to the length of the power cord 60 or line by changing the numbers of the extending frames 21. The power cord 60 or line also can be inserted into the collating spaces 215 of the extending frames 21 by pressing the collating panels 213 conveniently and easily. After the above-mentioned operation, the power cord 60 or line can be collated in the collating device 20 of the line-management assembly in accordance with the present invention.

Figure 4:
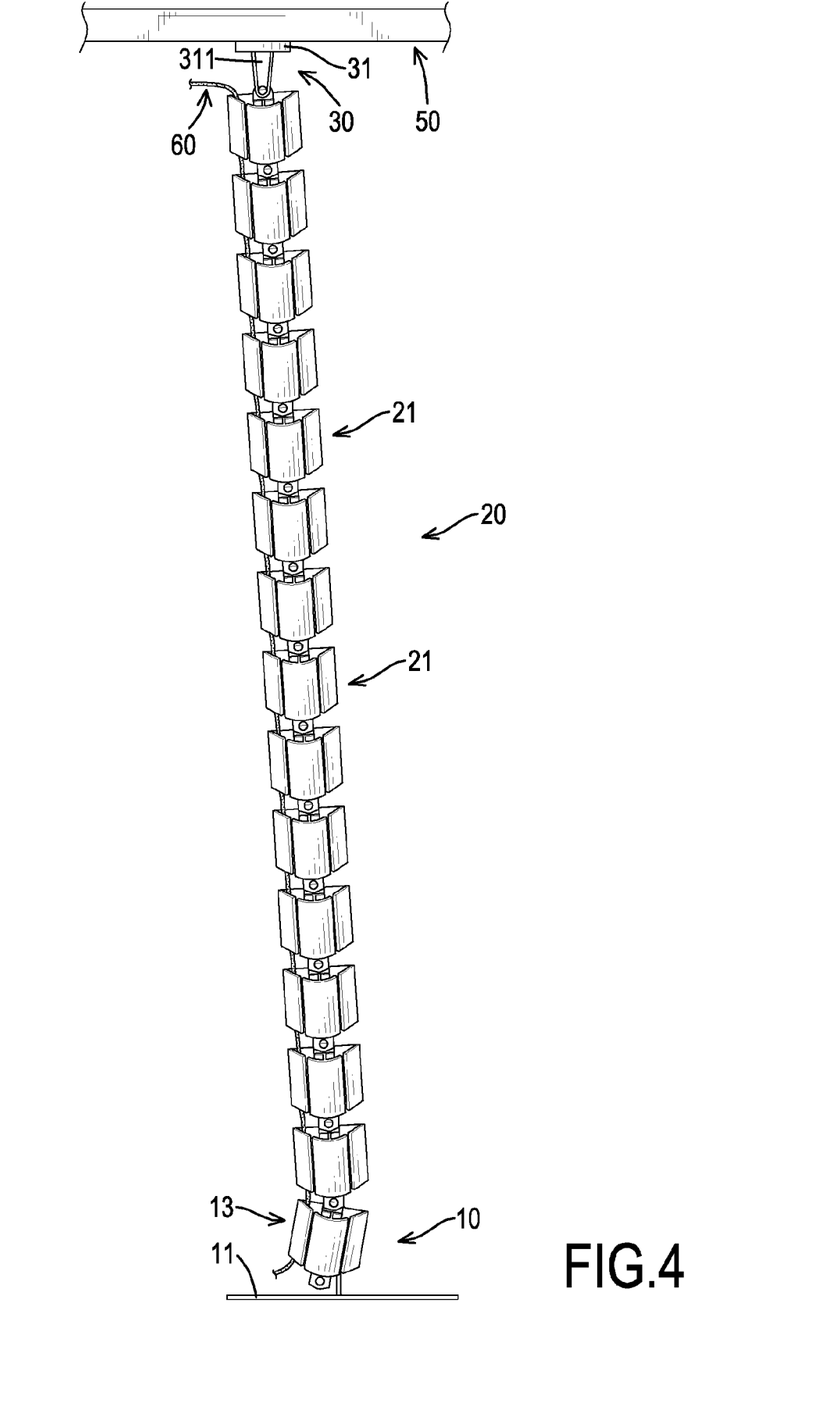
FIG. 4 is an operational side view of the line-management assembly in FIG. 1 connected to a table with a power cord.

With reference to FIG. 4, the connecting device 30 of the first embodiment of the present invention can be connected to a bottom of the table 50 by fasteners mounted through the holding holes 313 of the connecting frame 31 and connected to the bottom of the table 50. Thus, the end of the power cord 60 or line can extend to and be held below the bottom of the table 50.

With reference to FIG. 7, the connecting device 30A of the second embodiment of the present invention can be connected to a bottom of a table 50 by fasteners mounted through the holding holes 322A of the holding board 32A and connected to the bottom of the table 50. Thus, the end of the power cord 60 or line can extend to and be held below the bottom of the table 50. In addition, the direction of the power cord 60 or line can be adjusted by rotating the connecting frame 31A relative to the holding board 32A.

With reference to FIG. 10, the connecting device 30B of the third embodiment of the present invention can be mounted on the table 50 by rotating the leading screw 333B to change the distance between the connecting frame 31B and the clamping frame to make the clamping frame 33B and the connecting frame 31B respectively clamping on a top and a bottom of the table 50.

Figure 13:
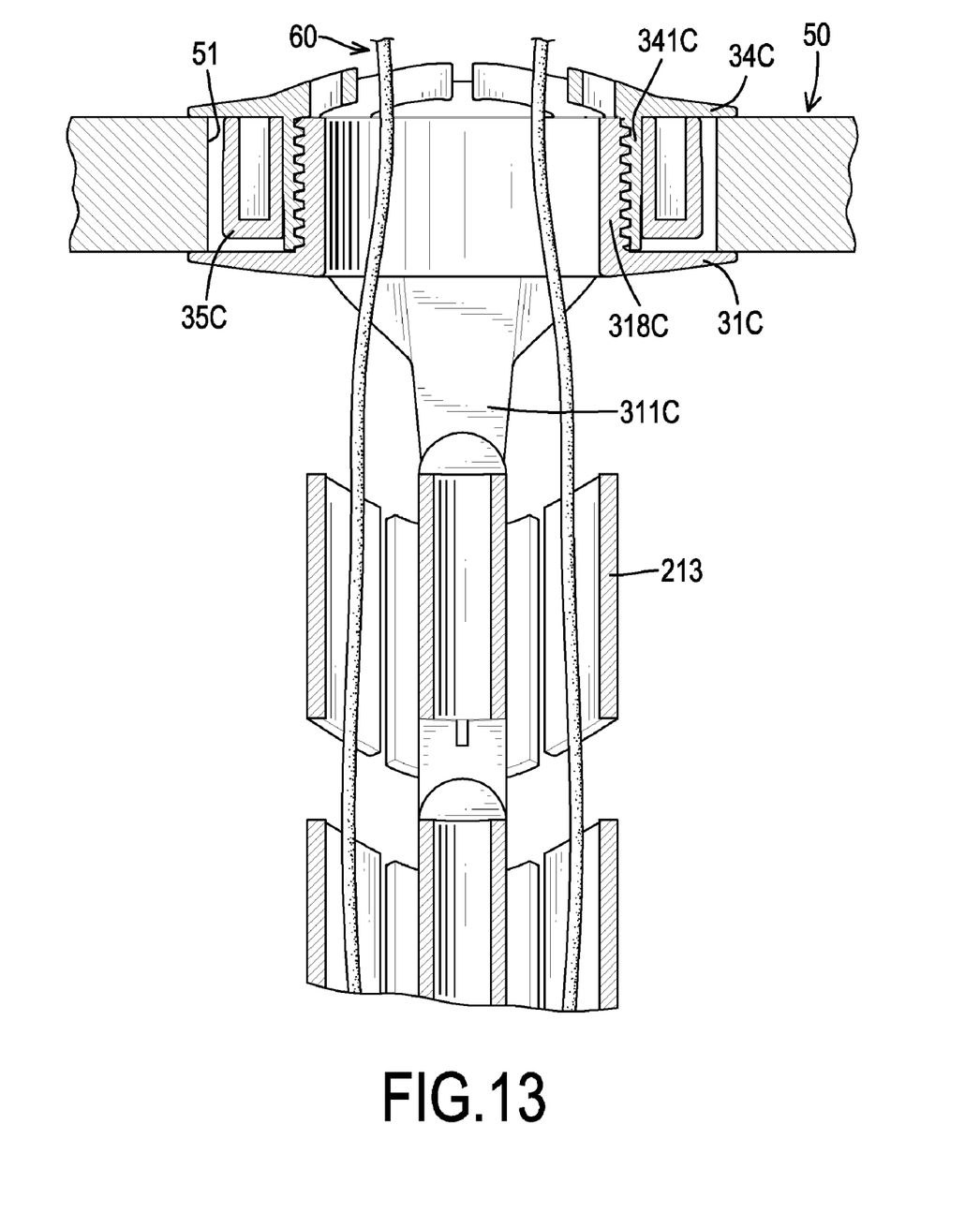
FIG. 13 is an operational side view in partial section of the line-management assembly in FIG. 11 mounted on a table.

With reference to FIG. 13, when the table 50 has a mounting hole 51 formed through the table 50, the decorative cap 34C and the connecting frame 31C can be respectively mounted on a top and a bottom of the table 50 to mount the adjusting ring 35C in the mounting hole 51 by the mounting jacket 341C screwing with the threaded tube 318C. Thus, the end of the power cord 60 or line can extend to the top of the table 50 via the connecting frame 31A, the threaded tube 318C and the decorative cap 34C. Additionally, the clamping arms 343C can hold the end of the power cord 60 or line that extends on the top of the table 50.

Figure 14:
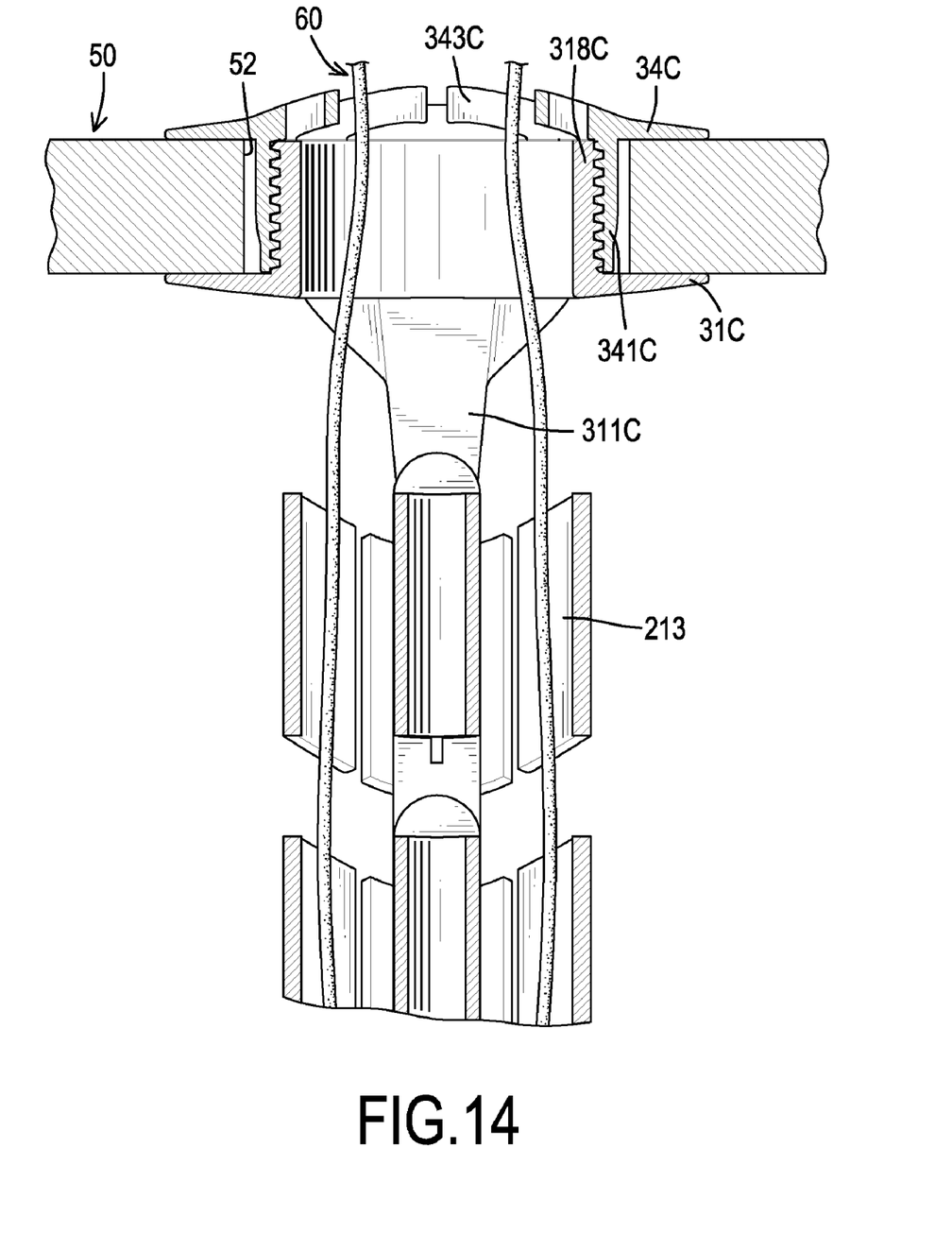
FIG. 14 is another operational side view in partial section of the line-management assembly in FIG. 11 mounted on a table.

With further reference to FIG. 14, when the diameter of the mounting hole 52 in smaller than the diameter of the adjusting ring 35C, the decorative cap 34C can be connected directly to the connecting frame 31C without the adjusting ring 35C. Thus, the connecting device 30C can be securely mounted on the table 50 to collate the power cord 60 or line.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A line-management assembly comprising
   a base having
      a bottom board having a center;
      a linking panel formed on and protruding from the center of the bottom board and having a top; and
      a linking frame rotatably connected to the linking panel and having
         a mounting tube being hollow, rotatably connected to the top of the linking panel and having
            an external surface; and
            a fastener mounted in the mounting tube and screwed with the top of the linking panel to hold the mounting tube with the linking panel;
         an outer casing formed around the external surface of the mounting tube and having
            multiple limiting panels arranged as an annular shape around the mounting tube at intervals and each limiting panel having
               an inner surface;
               a middle; and
               a linking board formed on and protruding from the inner surface of the limiting panel at the middle and mounted on the external surface of the mounting tube;
            multiple storing spaces defined between the mounting tube, the linking boards and the limiting panels; and
            two linking arms respectively formed on and protruding from two of the linking boards of the limiting panels, and each linking arm having
               a top end extending out of a corresponding linking board and facing to the top end of the other linking arm;
               an outer side; and
               a linking protrusion formed on and protruding from the outer side of the linking arm at the top end;
   a collating device pivotally connected to the base and having
      multiple extending frames detachably connected each other, including an uppermost extending frame and a lowest extending frame detachably attached to the linking frame of the base and each extending frame having
         a central tube being hollow and having an external surface;

an outer cover formed around the external surface of the central tube and having
multiple collating panels arranged as an annular shape around the central tube at intervals and each collating panel having
an inner surface;
a middle; and
an extending board formed on and protruding from the inner surface of the collating panel at the middle and connected to the external surface of the central tube;
multiple collating spaces defined between the central tube, the extending boards and the collating panels; and
two extending arms respectively formed on and protruding from two of the extending boards of the collating panels, and each extending arm having
a top end extending out of a corresponding extending board and facing to the top end of the other extending arm;
a bottom end extending out of the corresponding extending board and facing to the bottom end of the other extending arm;
an outer side;
a locking hole formed through the bottom end of the extending arm, wherein the locking holes in the lowest extending frame engage the linking protrusions on the linking frame; and
a locking protrusion formed on and protruding from the outer side of the extending arm at the top end and engaging one of the locking holes of the adjacent extending frame; and
a connecting device detachably connected to the collating device and having
a connecting frame detachably connected to the uppermost extending frame of the collating device and having
a bottom;
a top; and
two connecting arms formed on and protruding from the bottom of the connecting frame and each connecting arm having
a lower end; and
a connecting hole formed through the lower end of the connecting arm and engaging the locking protrusion of one of the extending arms of a corresponding extending frame to connect the connecting device with the collating device.

2. The line-management assembly as claimed in claim 1, wherein the bottom board of the base has
a periphery; and
an opening formed through the bottom board from the periphery to the center of the bottom board.

3. The line-management assembly as claimed in claim 2, wherein the connecting frame has two holding holes formed on the top of the connecting frame.

4. The line-management assembly as claimed in claim 2, wherein
the connecting frame has
a center; and
a connecting sleeve formed on and protruding from the top of the connecting frame at the center and having
a top end; and
multiple claws formed on the top end of the connecting sleeve at intervals; and the connecting device has a holding board detachably connected to the connecting frame and the holding board having
a center;
a top; and
a clawing hole formed through the center of the holding board and engaging the claws of the connecting sleeve to hold the connecting frame with the holding board.

5. The line-management assembly as claimed in claim 4, wherein the holding board has two holding holes formed on the top of the holding board.

6. The line-management assembly as claimed in claim 2, wherein
the connecting frame has
a sidewall;
a threaded hole being semicircular and formed through the sidewall of the connecting frame; and
two guiding grooves formed through the sidewall of the connecting frame beside the threaded hole; and
the connecting device has a clamping frame movably connected to the connecting frame and the clamping frame having
a sidewall facing the sidewall of the connecting frame and having an inner surface;
a top;
a mounting recess formed in the inner surface of the sidewall of the clamping frame, formed through the top of the clamping frame and aligning with the threaded hole of the connecting frame;
two guiding rails formed on and protruding from the inner surface of the sidewall of the clamping frame and respectively and movably mounted in the guiding grooves of the connecting frame; and
a leading screw rotatably mounted in the mounting recess of the clamping frame and engaging the threaded hole of the connecting frame to change a distance between the tops of the connecting frame and the clamping frame by rotating the leading screw.

7. The line-management assembly as claimed in claim 2, wherein
the connecting frame has
a center; and
a threaded tube formed on and protruding from the top of the connecting frame at the center and communicating with the collating device; and
the connecting device has a decorative cap screwed with the connecting frame and the decorative cap having
a bottom;
a top; and
a mounting jacket formed on and protruding from the bottom of the decorative cap, detachably connected to the threaded tube of the connecting frame, communicating with the threaded tube and having a center and an external surface.

8. The line-management assembly as claimed in claim 7, wherein the connecting device has an adjusting ring mounted around the mounting jacket between the connecting frame and the decorative cap.

9. The line-management assembly as claimed in claim 8, wherein
the decorative cap has multiple guiding bars formed on and protruding from the external surface of the mounting jacket at intervals; and
the adjusting ring has
an internal surface; and
multiple guiding recesses formed on the internal surface of the adjusting ring and respectively mounted around the guiding bars when the adjusting ring mounts around the mounting jacket.

10. The line-management assembly as claimed in claim 9, wherein the decorative cap has multiple clamping arms formed on the top of the decorative cap at intervals and protruding toward the center of the mounting jacket.

* * * * *